INVENTORS:
Delbert L. Phillips
Louis Clark Feightner

Attorneys

3,254,195
ARC WELDER
Delbert L. Phillips, Malibu, Calif., and Lewis Clark Feightner, North Canton, Ohio, assignors to Pulse Arc Welder Company, Santa Monica, Calif., a corporation of California
Continuation of application Ser. No. 192,862, May 7, 1962. This application Feb. 25, 1963, Ser. No. 260,448
16 Claims. (Cl. 219—96)

The present invention relates to welding means and more particularly to arc welding means adapted to provide an electrical discharge arc having very accurately controlled amounts of energy therein.

This is a continuation of now abandoned copending application Serial No. 192,862, filed May 7, 1962, by Delbert L. Phillips et al., for Welder.

It is very frequently desirable to heat or melt the adjacent ends of a pair of aligned members such as a pair of small wires for welding the two members together in an end-to-end butt weld or to melt one or more small portions of the adjacent edges of a pair of sheets to weld those portions of the member together to form a seam weld. It is also frequently desirable to heat the end of a member such as a wire or the ends of a group or bundle of wires to the melting point and then allow the melted material to coalesce into a smooth rounded surface as it cools. One form of welder that has been available heretofore is the so-called resistance welder. In this form of welder, the workpieces are first placed in a pair of clamps. These clamps electrically connect the workpieces into the welder circuit and also retain the workpieces positioned in intimate contact in the desired relationship. When the welder is energized, a surge of welding current flows between the clamps and the workpieces and across the resistance formed at the junction between the two workpieces. The flow of welding current through this resistance generates sufficient heat to weld the workpieces together. However, the same welding current also flows through the junctions of the clamps and the workpieces. This loss of energy not only reduces the efficiency of the welder, but also because of its random and variable nature, greatly interferes with the accuracy of the weld particularly when the workpieces are small.

In a resistance welder, it is necessary for the contacting surfaces of the workpieces to be carefully treated to insure the consistent contact therebetween. This results in a time consuming and expensive operation.

Since the workpieces are in intimate engagement prior to, during and after the flow of welding current, the resistance of the junction and the voltage thereacross are very low. This makes it very difficult to control the welding current to provide the precise amount of energy required for the weld. As a consequence, resistance welders are not suitable for welding small members such as wires together where it is desirable to produce a small weld, particularly where it is desired to provide a large number of such welds at a high rate of speed. Also resistance welders are incapable of heating a member such as the end of a wire so as to form a smooth rounded end thereon.

Another form of welder that has been available heretofore for welding a pair of workpieces together is the so-called impact welder. In this form of welder, the workpieces are initially separated by a substantial air gap. The welder is then energized in response to the two workpieces being brought together at a rapid rate and with a very substantial force. At the time of impact or slightly therebefore, an arc is struck between the two workpieces so as to heat the adjacent surfaces to a sufficient degree to cause the members to be forged or welded together by the impact. In such a welder, the operation of the entire welder must be synchronized with the motion of workpieces as they approach each other. This restricts the welding cycle to one that is compatible with the impacting of the members rather than one that produces the optimum weld. More particularly, the welding cycle must be started in response to the workpieces moving together and the size of the gap and the flow of current cannot be controlled independently. Although numerous attempts have been made to solve this problem, it has been necessary in impact welders to employ elaborate electrical circuits for switching the welding current "ON" and "OFF" in the required sequence in synchronism with the impacting of the members. As a consequence, the use of impact welders has been confined to the welding of relatively large members. Such welders are not capable of merely heating a member and allowing it to coalesce into a rounded mass nor are such welders capable of welding small, delicate members such as wires or thin sheets.

In order to heat the end of a member such as a wire for welding the member to another member, or merely to permit the melted end of the member to form into a smooth rounded surface as it cools, an electrical arc discharge may be produced from the surface to be heated. When employing arc welding means for this purpose, the end of the member is employed as an electrode and an electrical arc is discharged therefrom. Normally, the energy dissipated in the arc must be very accurately controlled and particularly where one or more of the members is a relatively small wire. At the present time, the only known means for creating arcs having energy that is controlled within sufficiently close limits is welding means such as disclosed and claimed in now abandoned copending application Serial No. 141,060, filed September 27, 1961, in the name of Delbert L. Phillips and assigned to New Twist Connector Corporation. In welding means of this nature, electrical energy is accumulated in storage means such as a bank of condensers and is then discharged across the electrodes in an arc that includes a high frequency, high voltage portion for striking or igniting the arc and a subsequent portion of lower voltage and longer duration to produce the required heating. Since all of the energy dissipated in the arc is provided by the energy storage means, the energy can be very precisely controlled. Although such welding means have been very effective in providing the required accuracy in the welding operation, it has been found that sometimes one or more of the electrodes may have a high voltage thereon. Under some circumstances and particularly during an interval when the welder is energized, the electrical potential on the electrodes may be sufficiently high to be dangerous to personnel coming into contact with one or the other of the electrodes. Accordingly, although such welders are capable of consistently producing high quality welds, they are used primarily in applications such as automatic mass production equipment where the operator will not come into contact with the electrode.

It is now proposed to provide welding means that will overcome the foregoing difficulties. More particularly, it is proposed to provide welding means that are capable of producing electrical arc discharges of very precisely controlled energy levels and that may be employed as a mass production welder or as a hand held tool. This is to be accomplished by providing a welder having a control circuit capable of producing an arc between a pair of spaced apart electrodes that contains a precisely controlled amount of energy without any of the welding electrodes having a dangerous potential thereon. The electrodes between which the arc occurs are normally electrically isolated from the energized portions of the circuit so that there will normally be no potential between the electrodes. In order to energize the electrodes during a welding operation, the electrodes may be momentarily coupled to an energy source, such as an energy-storing means, so that there will be initially a high frequency, high voltage across the air gap to thereby ignite an arc so that the major portion of the energy may be discharged in the arc at a relatively low voltage so as to thereby provide the desired heating action for the welding operation. The coupling means is of a highly resonant nature and the successful generation of the initial high voltage igniting pulse and the subsequent welding pulse are dependent upon the character of this resonance. If an operator is in contact with the electrode, at the instant the welder is actuated to produce a weld, the operator will cause the coupling means to be disturbed to such an extent that the high voltage igniting pulse and the low voltage welding pulse cannot be developed whereby the operator will not be adversely affected, even during a welding cycle.

These and other features and advantages of the present invention will become readily apparent from the following detailed description of one embodiment of the present invention, particularly when read in connection with the drawigs wherein like reference numerals refer to like parts and wherein.

Figure 1:
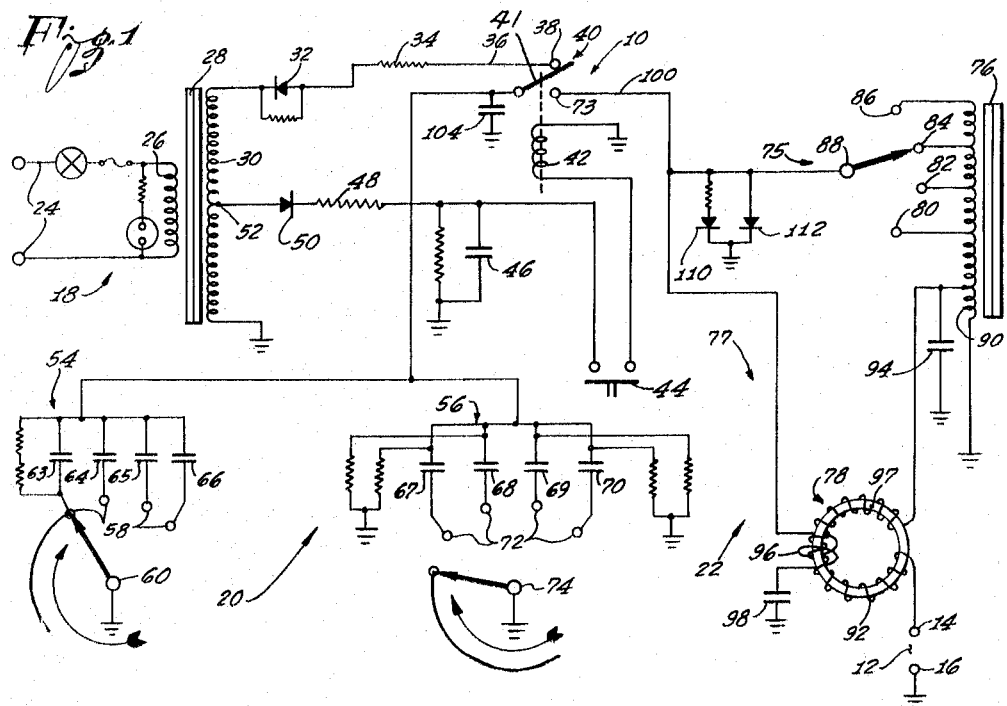
FIGURE 1 is a wiring diagram of welding means embodying one form of the present invention.

Referring to the drawings in more detail, and particularly to FIGURE 1 thereof, the present invention is particularly adapted to be embodied in welding means 10 for producing an electrical arc that extends across the space 12 between the two electrodes 14 and 16. These electrodes 14 and 16 may comprise at least one member, or workpiece, that has a surface thereon which it is desired to heat to some precisely predetermined amount. The present welding means 10 is especially useful for such purposes, since it is capable of supplying very accurately controlled amounts of energy to an arc extending between the electrodes 14 and 16. For example, one of the electrode members may be a wire which it is intended to secure to another wire, to a connector, etc., or it may be desired to merely heat the end surface of a member such as a wire to produce some predetermined heating thereof to cause the end of the wire to melt and then congeal into a rounded surface.

More particularly, it may be desirable to employ a single arc discharge to heat a small portion on the end of a member such as a small wire or the adjacent ends of a group of wires to the melting point and to then allow the melted portion to coalesce into a smooth rounded end surface. Thus, the wire or the group of wires will have a smooth end surface suitable for use as a connector that may be inserted into a connector receptacle. Alternatively, it may be desirable for one of the electrodes, for example 16, to comprise a pair of members such as two thin sheets that have their edges disposed immediately adjacent each other. A single arc discharge may then be produced between the electrode 14 and a small portion of these edges to heat them sufficiently to form a small molten portion that will coalesce and form a small weld that joins the members together. Alternatively, it may be desirable for the electrodes 14 and 16 to comprise a pair of small members such as a pair of wires that it is desired to join togetther in an end-to-end butt weld. A single arc discharge between the wires will melt small portions on the ends of these wires to the melting point. The wire members may then be joined together to allow the molten metal to coalesce and form a butt weld between the two wires. The present welder 10 is especially useful for such purposes since it is capable of supplying very accurately controlled amounts of energy to the electrodes 14 and 16.

The present welding means 10 includes a control circuit which has an input section 18, an energy section 20, and a coupling section 22 for coupling the energy from the energy section to the electrodes 14 and 16.

The input section 18 includes a pair of electrical conductors 24 which may be interconnected with a suitable power source such as a conventional 115 volt alternating current supply line. The conductors 24 are interconnected with a primary winding 26 of a conventional iron core transformer 28. The primary winding 26 is connected continuously to the power source and will not be switched on and off for each welding cycle. As a consequence, the welder may be recycled at a very rapid rate over an extended period of time without causing overheating of the transformer. The secondary 30 of the transformer 28 is wound around the core and has a large number of turns so as to increase the voltage to a higher amount. This level may be of any amount that is compatible with readily available parts. For example, it may be in the range of at least 500 volts. The one end of the secondary 30 is connected directly to ground while the opposite end is connected to suitable rectifying means such as a diode 32. The diode 32 may be interconnected with a resistor 34 having a conductor 36 interconnected therewith. The diode 32 will act as a half wave rectifier and thereby provide a pulsating D.C. current on the conductor 36. The load resistor 34 will be effective to limit the maximum amount of current that can flow through the diode 32 and transformer 28.

The end of the conductor 36 may be connected to one of the stationary contacts 38 in a single-pole, double-throw switch 40. Although the switch 40 may be of any suitable variety, it has been found desirable for movable contact 41 of the switch to be actuatable by means of a relay coil 42. The present coil 42 is operatively interconnected with ground and with one side of a control or trigger switch 44. The opposite side of the switch 44 is connected to a condenser 46 and a current limiting resistor 48. The limiting resistor 48 is, in turn, connected with a diode 50 leading to a center tap 52 on the secondary 30. When the trigger switch 44 is open, the diode 50 will cause the condenser 46 to accumulate a charge thereon. When the trigger switch 44 is closed, the relay coil 42 will be energized to move the contact 41 while the condenser 46 discharges. When the condenser 46 has discharged, the resistor 48 will limit the current in the coil to such a small amount the relay coil 42 will be unable to hold the movable contact 41 down. When the trigger switch 44 opens, the condenser 46 will again charge so as to permit the switch 40 to again be actuated.

The energy section 20 is particularly adapted to provide precisely controlled amounts of energy for discharge through an arc extending between the electrodes 14 and 16. Although there are numerous means for accomplishing this, in the present instance, the energy section 20 includes energy storage means such as a bank of condensers. The condensers are preferably connected in parallel and divided into two groups 54 and 56. The condensers 63, 64, 65 and 66 in the first group 54 have the upper sides thereof connected together and to the movable contact 41 in the switch 40. The lower sides are separately connected to the fixed contacts 58 in a multiposition switch 60. The switch 60 includes a movable contact that is connected to ground and arranged for selectively engaging preselected combinations of the contacts 58 leading to the condensers 63 to 66, inclusive. The second group 56 is similar to the first group 54 in that it also includes a plurality of condensers 67, 68, 69 and 70 that have the upper sides connected together and to the movable contact 41 in switch 40. The lower sides of the condensers 67 to 70, inclusive, are each connected to fixed contacts 72 in a second multiposition switch 74. By making the condensers 63 to 70, inclusive, of varying capacities, the effective capacity of the bank may be varied through a wide range. The capacity of the bank is preferably sufficient to permit the storage of an amount of energy in a range on the order of .4 to 40 watt seconds and to permit a choice of a large number of energies therebetween. The amount of energy that is stored in the condensers 63 to 70, inclusive, will be a function of the setting of the switches 60 and 74 and also the voltage of the charge. This voltage will be substantially equal to the peak voltage produced by the secondary 30.

The remaining fixed contact 73 in the double-throw switch 40 may be connected to the coupling means 22. The present coupling means 22 includes a first branch 75 having a step-down autotransformer 76 and a second branch 77 having an output transformer 78. The lower end of the transformer 76 is connected directly to ground while the upper end includes a plurality of input taps, each of which is connected to one of the contacts 80, 82, 84 and 86 in the multiposition switch 88.

The lower section 90 of the transformer 76 is provided with an output tap that will provide a voltage that is reduced from the voltage on the switch 88 by an amount determined by the effective turns ratio resulting from the setting of the switch 88. More particularly, if the switch 88 is set on the contact 80, the voltage on section 90 will be highest and if the switch is set on the contact 86, the voltage will be lowest. The tap is connected to one end of a secondary winding 92 on the transformer 78. The opposite end of the secondary winding 92 may be connected to one of the electrodes 14 or a holder for positioning the work member to be heated so that it will function as an electrode. The upper portion of the transformer 76 will carry the charge for heating the workpieces 14 and 16. However, the voltage of the charge as it enters the transformer 76 will be substantially equal to the peak voltage across the winding 30 or on the order of 800 volts. As a consequence, the magnitude of the current flowing through the switch 88 and the upper end of the transformer 76 will be correspondingly low. The lower portion 90 will also carry the full charge, but the voltage thereof will be reduced by an amount corresponding to the ratio between the turns selected by the switch 88 and the portion 90. This will not only reduce the voltage to the approximate potential of the arc, but will also increase the amount of current to the level of the actual welding current. Accordingly, the portion 90 may include a small number of turns of relatively large diameter wire. For example, portion 90 may have 25 turns of a pair of #10 wires.

The lower section 90 of the transformer 76 has an internal capacitance and an inductance and will therefore have a natural resonant frequency. As a consequence, this section 90 may tend to "ring" when a discharge occurs therethrough. Because of the small number of turns and the large wire size, the "Q" of this circuit will be high and, as a consequence, this section 90 may tend to "ring" when a discharge occurs therethrough. The "ringing" frequency may be in a range beginning on the order of 5 or 10 megacycles or higher. If necessary, a condenser 94 may be placed across the section 90 to modify the frequency and/or to provide a ground return for the high frequency, high igniting voltage in coil 92.

The second branch 77 of the coupling means 22 extends from the contact 73 of the switch 40 and is coupled to the first branch 75 by any suitable means such as the transformer 78. The primary winding 96 is disposed in series with the branch 77 and the secondary may be disposed in series with the branch 75 as shown in the present instance. The transformer 78 preferably is of the high frequency variety and includes a core 97 consisting of a suitable magnetic material such as a ferrite so that the primary winding 96 will be inductively coupled to the secondary winding 92. It has been found desirable to employ a ferrite having a very small amount of residual magnetism so that it will have very little, if any, residual or permanent magnetism left therein after a welding cycle. It is also desirable for the core to have a low saturation such that it will saturate very rapidly when branch 75 and/or branch 77 are energized. When so saturated, the impedance of the windings and the coupling therebetween will decrease. Although there are a large number of ferrite materials that are suitable for this use, by way of example, it has been found that Ferroxcube 104, manufactured by the Ferroxcube Co. is particularly well adapted for this use. The primary winding 96 preferably has only a small number of turns and the secondary has a very large number of turns so that the voltage across the primary 96 will be increased to a much higher level. The lower end of the primary winding 96 is connected to ground by means of a condenser 98. The inductance and capacitance of this circuit and particularly the primary winding 96 have a natural resonant frequency so as to form a ringing circuit. The "ringing" frequency of this circuit is preferably several times higher than the ringing frequency of the section 90. For example, the frequency may be in a range extending from about 100 or 200 megacycles up into the kilomegacycle range.

In order to employ the present welding circuit for heating an end of a member, the primary 26 of the transformer 28 may be connected to a suitable power source such as a 115 volt A.C. line. This will cause an alternating voltage to be developed across the opposite ends of the secondary winding 30. The diode 32 will function as a halfwave rectifier and permit only a series of halfwaves or D.C. pulses to be present on the conductor 36. These pulses will then travel from the fixed contact 38 to the movable contact 41 of the double-throw switch 40 and then to the upper sides of the condensers in the two groups 54 and 56 of condensers. The condensers 63 to 70, inclusive, that have their lower sides connected to ground as determined by the settings of the two switches will accumulate a charge having a voltage approximately equal to the peak voltage across the winding 30. The transformer 28 will remain energized at all times so that the potential on the line 36 will be maintained continuously and the transformer 28 will not be switched "ON" and "OFF" during each welding cycle. Accordingly, the rate at which the condenser banks 54 and 56 may be recharged will be limited only by current carrying capabilities of the diode 32 and the resistor 34. This will permit designing a welder where it is possible for the condenser banks to recharge to their full value within a period of less than one cycle or at most two cycles of the 60 cycle per second power source. Thus, immediately following a welding cycle, the contacts 38 and 41 will close and the banks 54 and 56 will be instantly recharged and ready to recycle for another weld. The switches 60 and 74 are, of course, set so that the amount of energy stored on these condensers 63 to 70, inclusive, will correspond to the nature of the workpieces and the extent to which they are to be heated. When it is desired to weld larger members or when a pair of small members are to be welded by means of a large size weld joint, the amount of capacity of the banks 54 and 56 may be increased to store a correspondingly larger amount of energy.

It may be seen that although there my be a high voltage on the conductor 36 and the condensers 63 to 70, inclusive, may be charged to the same voltage, the movable contact 41 will not engage the fixed contact 73 and there will be no voltage present on either of the electrodes 14 or 16. Therefore, even though the welder 10 is turned on, an operator may contact the electrodes 14 and 16 without any danger.

Once the electrodes 14 and 16 have been properly positioned for performing the desired operation, the trigger switch 44 may be closed. This may be accomplished either manually or if the welder 10 is a part of a larger overall machine or system, it may be done automatically. Closing the trigger switch 44 will permit the charge on the condenser 46 to discharge through the relay coil 42 and cause the movable contact 41 in the switch 40 to move from the fixed contact 38 into engagement with the other fixed contact 73. As soon as the charge on the condenser 46 has dissipated, the resistor 48 will limit the current flow through the coil 42. As a result, the coil 42 will not be capable of retaining the movable contact 41 against the fixed contact 73.

During the brief interval that the movable contact 41 is positioned against the fixed contact 73, both the branches 75 and 77 will be simultaneously connected to the condenser banks 54 and 56. Since the identical set of contacts is employed for energizing both branches, the two branches will be energized at the same instant and it is not necessary to synchronize the closing of a plurality of separate contacts for each branch. The charge accumulated on the condensers 63 to 70, inclusive, will flow through the switch 40 to the fixed contact 73 and onto the conductor 100. Although this charge contains all of the energy that is employed for heating and/or welding the workpieces, the potential of the charge will be substantially equal to the peak voltage of the voltage from the condenser bank. As a result, the voltage will be many times higher than the voltage across the air gap. Therefore, the magnitude of the current that is switched by the switch 40 will be greatly reduced from the magnitude of the welding current.

Because of the transformer 76 and the open circuit formed by the air gap 12, initially a portion of the discharging energy will flow through the primary winding 96 to ground. This will produce an initial pulse in the secondary 92 that will appear across the air gap 12. Because of the small number of turns on the primary 96 and the large number of turns on the secondary 92, the voltage will be stepped up so as to produce a very high voltage across the air gap 12.

The amount of the increase in voltage will be in part a function of the ratio between the turns in the winding 96 and the winding 92. In addition, the increase will be a function of the resonant character of the winding 96. Since this winding 96 has a small number of turns (for example, one turn of No. 18 or No. 20 wire) and, therefore, a small resistance, it will have a very high "Q" ratio, i.e., the ratio of reactance to resistance. Since the winding 96 forms a resonant circuit with the capacitor 98 and since the resonant circuit has a high "Q," voltages will build up to very high levels across the winding 96. This will cause a corresponding voltage to build up across the winding 92. This high voltage may result in a high voltage pulse flowing back along the conductor 100. In order to prevent any damage being produced by this pulse, a pair of diodes 110 and 112 may be provided between the conductor 100 and ground. One of these diodes 110 is preferably of the variety having a switching time on the order of a microsecond. This will squelch even the initial phases of the pulse. However, since such a diode normally has a limited current capacity, it is also desirable to employ a second diode 112 having a longer switching interval but a greater current capacity.

Figure 2:
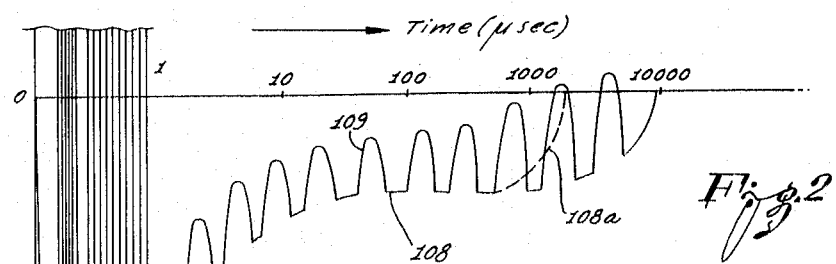
FIGURE 2 is a graph of the voltages existing between electrodes during a welding operation.

Since the primary winding 96 is in a series circuit with the capacitance 98 and with the internal capacitance of the winding, the circuit will have a natural resonant frequency and will "ring". As may be seen from FIGURE 2, this will produce across the winding 96 an initial high voltage pulse 102 having one or more alternating frequency components 103 therein. This voltage will be stepped up by the secondary winding 92 and a sufficiently high voltage will be produced to ionize the air gap 12 and thereby ignite the arc. It has been found, by way of example, that this voltage pulse 102 may include a portion 103a that is believed to rise to a high peak voltage. As a result of tests made on operative welders embodying the present invention, it is believed that this voltage is on the order of 50 to 100 kilovolts or higher and rises to this voltage in an interval of about ½ microsecond or less. It is also believed as a result of these tests that the component 103a may persist for several hundredths of a microsecond at a frequency in the general region of a kilomegacycle. Following this the second component 103b occurs. This component 103b was believed to be in a range of around 165 megacycles or thereabouts. This frequency is believed to be determined primarily by the resonant frequency of the winding 96. This component 103b will apparently persist for on the order of about ½ microsecond or as long as is required for the branch 75 to become fully conductive. It is believed that the components 103 may go positive by approximately the same amount that they go negative.

It is desirable for the rise time of pulse 102 to be very short, for example, on the order of one-half microsecond or less. Under normal circumstances, it is desirable for the banks 54 and 56 to be capable of storing up to 35 watt seconds of energy. To do this, it may be necessary to employ electrolytic condensers in the banks 54 and 56 in order to obtain an adequate amount of capacity. If the storage banks of condensers 63 to 70, inclusive, are of the electrolytic variety, they will normally have relatively slow discharge rates. In this event, the limiting effects of the banks 54 and 56 may be overcome by a separate condenser 104 having a very rapid discharge rate being disposed in parallel to the condensers 63 to 70, inclusive. This will greatly shorten the rise time of the voltage pulse 102 and/or components 103. Also, because of the high "Q" nature of the winding 96, it will assist in further increasing the maximum voltage of the pulse 102 and component 103 produced across the air gap 12.

When the contacts 41 and 73 close, the condensers 63 to 70, inclusive, and the condenser 104 will be connected directly in series with the branch 77. As a consequence, the entire charge of the stored energy will be instantly available to flow into the branch 77. At the instant the contacts close the full voltage across the capacitances 54 and 56, corresponding to the peak voltage across the winding 30, will be imposed across the branch 77. Since the only resistance present in the branch 77 will be that of a short length of electrically conductive wire, the ratio of the reactance-to-resistance or the so-called "Q" will be very high and the voltage will build up extremely rapidly, i.e., less than one-half microsecond. Because of the resonant characteristics of this branch, the voltage will build up to a very high value. This voltage will be further stepped up in the secondary winding 96 of the transformer so that a voltage as high as 40 kilovolts may be produced across the winding.

As soon as the high frequency voltage is developed in the winding 97, when an infinite impedance occurs between the electrodes 14 and 16, it will appear across the air gap 12 and cause the air to ionize and strike an arc across the gap 12. Once the arc has been ignited, the resistance between the electrodes 14 and 16 will decrease from a very high value on the order of infinity to a very low value on the order of a few ohms or even a fraction of an ohm. The time required for the air gap to become conductive will be equal to or less than the time required for the energy to travel through the branch 75 and transformer 76 so as to appear across the portion 90. Since the conductive air gap has an impedance that is small compared to that of portion 90, the remaining energy on the condensers 63 to 70, inclusive, will discharge through the autotransformer 76, and be transformed by the portion 90 so as to discharge into the arc. If the gap 12 is still of very high resistance at the time the energy arrives at the portion 90, it will travel directly to ground via the portion 90 and not through the arc. Although the voltage from the lower section 90 will be stepped down, as may be seen in FIGURE 2, this portion 108 of the arc will have a voltage with sufficient amplitude to sustain an arc until substantially all of the energy in the condensers 63 to 70, inclusive, is discharged. The amplitude of the voltage will be determined primarily by the turns ratio of the autotransformer 76. This is determined by the setting of the switch 88. It may also be observed that although the voltage during the portion 108 may contain a high frequency variation 109, it will be of substantially constant polarity throughout the welding operation. This constant polarity will be effective to insure a substantially undirectional current flow during the portions of the weld cycle when the majority of heating occurs. This is particulary important when the workpieces are of dissimilar materials. The material having the lowest boiling point should be on the positive side as this tends to prevent the formation of a gaseous weld.

If the metal being heated is a good thermal conductor such as aluminum or copper, it is normally desirable to set the switch 88 to produce a higher voltage. This will result in a more rapid discharge with a more intense but shorter heating of the workpiece. However, if the metal or alloy being heated has a material therein that cannot withstand high temperatures for some reason, such that it tends to gasify, it is normally desirable to set the switch 88 to produce a lower voltage. This will provide an arc that is cooler but which has a longer duration. The amount of energy dissipated in the arc comes from the condensers 63 through 70, inclusive. Accordingly, the switches 60 and 74 may be set so that the exact amount of energy required for the weld will be stored in the banks 54 and 56 and, irrespective of the setting of the switch 88, substantially the same amount of energy will be provided in the arc for the heating of the member. At the same time, the voltage of the arc may be determined by the switch 88 to thereby control the rate at which energy is fed into the weld.

The portion 108 of the arc is the primary source of the energy that produces the heating. It has been found that although the characteristics of the arc may vary over wide limits, the portion 108 should last for an interval on the order of a few milliseconds and have a voltage on the order of a hundred volts or less. The magnitude of the welding may vary over a wide range. It has been found that in some instances the current rises to as much as 1,000 amperes during at least a portion of the cycle. Since the core 97 of the transformers 78 saturates at a very low level, at the time of the discharge of the heavy current, the impedance will be very small and there will be very little loss across the transformer 78. By way of example, it has been found that when the workpieces are the electrodes and they are to be welded together, it is desirable to complete the weld within an interval on the order of 4 milliseconds or less. Where the workpiece or workpieces constitute only one electrode and they are only heated to form a rounded end thereon, or to form a spot weld on the adjacent edges, the time interval may be on the order of 8 milliseconds or less. This will cause only the portions immediately adjacent the weld to be heated. The heat will not have a chance to diffuse over a wide area and anneal a substantial portion of the workpieces. Also the temperatures of the workpieces and particularly the molten portions will not be elevated for a sufficient interval to permit oxidizing of the members. As a result, a clean, strong weld will be produced with little or no stress in the workpieces. The duration of the weld may be controlled by varying the voltage across the arc to insure the rate of discharge being such that all of the energy is dissipated in the required interval. Also, when the electrodes 14 and 16 are workpieces that are to be welded together, such as disclosed and claimed in copending application Welder Serial Number 259,588, filed February 19, 1963, by Delbert L. Phillips and assigned to Pulse Arc Welder Company, they may be brought together so as to short out the arc within the desired time limit. In this event, as may be seen in FIGURE 2, the arc would normally persist for about 10 milliseconds but when the workpieces contact the arc will stop similar to dotted line 108a at about 1 or 2 milliseconds.

It will be apparent from the foregoing description that in the event an operator is in personal contact with the electrodes 14 and 16, he cannot be injured from an electrical shock. Normally, the contacts 41 and 73 of the switch 40 will be open and all of the energized portions of the circuit will be isolated from the electrodes 14 and 16 and there will be no voltage present between the electrodes. In the event that the trigger circuit 44 is energized and the contacts 41 and 73 closed while the operator is in contact with the electrodes 14 and 16, the resistance across the air gap 12 will be greatly reduced and this reduced resistance will be reflected into the circuit formed by the winding 96 and the capacitance 98. The resonant characteristics of primary 96 will accordingly be altered to such an extent that the energy will be dissipated as a lower voltage surge through the transformer 76. This voltage will be so low that the operator will not be injured thereby.

When an operator contacts the electrodes 14 and 16, the resistance of the air gap will be on the order of a few thousand ohms and some capacity will be added to the air gap. This resistance and any reactive components will be reflected through the transformer 78 into the primary 96. As a consequence, the resonant characteristics of the primary 96 will be very greatly altered. Among other things, the "Q" or ratio of reactance to resistance will be very drastically reduced. This will virtually destroy the increase in voltage resulting from the resonant effects and thereby prevent the extremely high voltages being built up across the primary 96 and the air gap 12. At the same time, the reactance from the contact by the operator will be added to that of the winding 96 and the resonant frequency will be greatly reduced. The length of time required for this reduced voltage pulse to build up across the primary winding 96 will be correspondingly greatly increased. Because of this increased length of time, the resistance of the air gap 12 will be on the order of a few thousand ohms rather than a few ohms at the time the energy in branch 75 is starting to build up in portion 90. As a consequence of this very high resistance, the energy will follow the path of last resistance and will flow through the portion 90 directly to ground. Thus, the energy will be dissipated as a lower voltage surge through the lower portion 90 of the transformer 76. Since the current surge largely bypasses the operator, the operator will not be injured.

The rate at which the condensers 63 to 70, inclusive, recharge is limited only by the current rating of the diode 32, and the transformer 28. Accordingly, by decreasing the resistance of the resistor 34 and increasing the current rating of the diode 32, the recycling time of the welder may be very short. As soon as a weld cycle has occurred, the contacts 38 and 40 will close and the condenser banks 54 and 56 will be connected to the transformer secondary 30 and will charge to the peak voltage within less than one cycle or at most two cycles of the 60 c.p.s. power source. Thus, a very high recycling rate is possible. For example, it is possible to make several welds per second or hundreds of welds per minute. This results in part from the fact that the condensers 54 and 56 discharge through the air gap 12 in such a short time that it occurs while the movable arm 41 is traveling from the contact 73 to the contact 38. In this way, the condensers 54 and 56 are ready to become discharged again at the instant that the movable arm 41 engages the contact 38.

It may be seen from the foregoing that a welder has been provided that is not only simpler and more reliable, but is also more accurate and easily controlled as well as being safer to operate. The entire welding cycle is started by closing of a single pair of contacts 41 and 73 in a single switch 40. This switch is effectively isolated from the portion of the welder that produces or carries the heavy welding currents. Although the switch does control the weld energy, it does so when the energy is at a high voltage and low energy. Therefore, the switch does not need to have a large current carrying capacity. When the switch 40 closes, it simultaneously interconnects both the high voltage, high frequency branch 77 and the low voltage, heavy current branch 75 to the source of welding energy. This eliminates the necessity for trying to synchronize the sequence for closing a series of contacts for energizing of the two separate branches. The two branches 75 and 77 are coupled together and the operation of the branch 75 is dependent upon the striking of the arc within the time required for the energy to arrive at the portion 90. Thus, once the welding cycle is initiated, its completion is fully automatic if there are no abnormal conditions present at the electrodes 14 and 16. In the event there is some abnormality, the arc will not be struck and the energy will pass through the portion 90 to ground.

Figure 3:
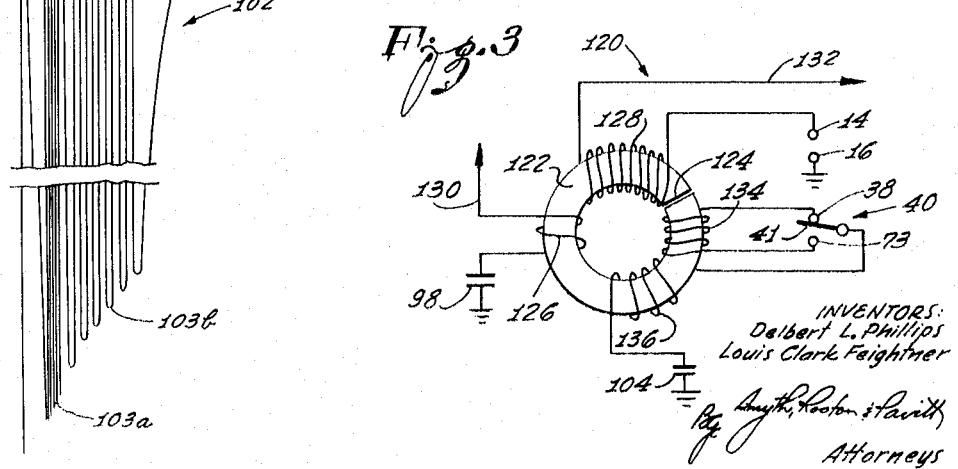
FIGURE 3 is a view of a modification of a transformer suitable for use in the welding means of FIGURE 1.

As an alternative to the foregoing embodiment, the transformer 78 may be replaced with the transformer 120 shown in FIGURE 3. This transformer 120 is very similar to the transformer 78 in FIGURE 1. It includes a core 122 having substantially the same shape and size and consisting of the same ferrite or other high frequency magnetic material. The core 122 in this embodiment may have a small gap 124 formed therein. This gap 124 may be made by cutting radially through the core 122 and then filling the cut with a bonding material such as an epoxy resin. A gap on the order of 0.0002 inch will effectively stop the circulation of spurious high frequency signals in the core 122 without adversely affecting the lower frequency or D.C. signals.

The transformer 120 may include a primary winding 126 and a secondary winding 128 positioned thereon. These windings 126 and 128 are substantially identical to the windings 96 and 92, respectively, in the first embodiment and they are connected into the welder in substantially the same manner. More particularly, the conductor 130 from one side of the winding 126 is connected to the contact 73, while the conductor from the one end is connected to the condenser 98. The conductor 132 from one side of the winding 128 is connected to the condenser 94 and winding 90, while the conductor from the other side is connected to the electrode 14.

The ferrite preferably requires very little energy to magneticaly drive it and also it preferably has a minimum residual magnetism. However, in some instances the core may tend to retain residual magnetism of a sufficient magnitude to interfere wtih the operation of the welder. In this event, the gap 124 may tend to polarize with the pole faces on the opposite sides thereof becoming permanently magnetized. Since this polarization may tend to interfere with the generation of a succeeding pulse, it is desirable to insure the depolarization of the air gap after each welding cycle. This may be accomplished by means of a small coil 134 wound on the core 122. The coil 134 is electrically connected between the two fixed contacts 38 and 73 to the switch 40. As a result, after the completion of the welding cycle, when the movable contact 41 returns to contact 38, a surge of current will flow through the coil 126 and demagnetize the gap 124.

It has also been found desirable to provide an additional coil 136 on the core 122. The coil 136 may be connected in series with the condenser 104. Since this condenser 104 discharges rapidly, its discharge current flowing through the coil 126 will greatly increase the rate of rise of the pulse 102. As a consequence, the amplitude of the voltage will be increased and the time for the buildup will be decreased. In addition, the combination of the condenser 104 and the winding 136 will cause the winding 136 to ring longer. As a consequence, the duration of the pulse 102 will be increased.

By way of example, in one operative welder embodying the present invention, the various components had approximately the following characteristics. The transformer 28 had a turns ratio such that the voltage from the secondary 30 was on the order of approximately 800 volts and the banks 54 and 56 of the condensers may be variable through a range up to at least 1,500 microfarads. The condenser 104 may have a capacity on the order of 60 microfarads, and the condenser 98 may have a capacity on the order of .47 microfarad. The primary winding 96 was one turn of #20 wire, and the secondary was 33 turns of #10 wire.. The internal inductance and capacitance of either the winding 96 and/or the condenser 98 was such that the resonant frequency was equal to approximately 1 kilomegacycle.. The transformer 76 has a total of approximately 345 turns. The portion 90 on the lower end of the transformer 76 consisted of approximately 25 turns of a pair of #10 wires connected in parallel with each other.

It may thus be seen that a welder has been provided that is not only particularly adapted to repeatedly provide very accurately controlled welds, but is also extremely safe. Although only a limited number of embodiments of the welder are disclosed, it will be readily apparent to those skilled in the art that numerous changes and modifications may be made thereto without departing from the spirit of the invention. Accordingly, the foregoing drawings and description thereof are for illustrative purposes only and do not in any way limit the invention which is defined only by the claims which follow.

What is claimed is:

1. A pulse arc welder for producing an electrical arc discharge across an air gap between a pair of workpieces, said welder comprising the combination of:

energy storage means for accumulating an electrical charge of energy containing the amount of energy required to be dissipated in said arc, a first discharge path having a first winding therein, the portion of said path having said winding having a high resonant frequency, a second discharge path having a first branch and a second branch disposed in parallel to said first branch and said first branch including a second winding, an autotransformer having a winding therein and said air gap, said branch having a very high resistance when said air gap is electrically nonconductive and a very low resistance when said air gap is electrically conductive, said second branch including a portion of the winding in said autotransformer and being disposed in parallel to said second winding and said air gap, control means having a first operative relationship effective to prevent the discharge of energy from said storage means and having a second operative relationship for connecting said first and second discharge paths to said storage means for discharging the energy in said charge through said paths, said autotransformer being effective to produce a voltage pulse between said workpieces and across said air gap a predetermined time after said control means becomes disposed in said second operative relationship, said first winding in said first discharge path being effective to create a high voltage, high frequency pulse in said resonant portion when the energy is discharged as a result of said control means becoming disposed in said second operative relationship, and a core coupling said first and second windings for coupling said high voltage, high frequency pulse into said first branch and across said air gap and to reflect the impedance of said air gap into said resonant portion, said resonant portion normally having a high "Q" to thereby produce said high voltage, high frequency pulse between said workpieces in less than said predetermined time to thereby make said air gap electrically conductive prior to the occurrence of said voltage pulse for discharging the rest of said energy through the first branch of said second path to form a continuation of said initial arc at a high energy level, the reflection of a low impedance from said air gap into said first winding being effective to prevent the creation of said high voltage, high frequency pulse prior to said predetermined time.

2. A pulse arc welder for producing an electrical arc discharge across an air gap between a pair of electrodes, said welder comprising the combination of:

energy storage means for accumulating an electrical charge of energy, a first discharge path having a first winding therein with at least a portion of said path having a high resonant frequency, a second discharge path operatively interconnected with a portion of said energy storage means, said second path having a first branch including a second winding and said air gap and a second branch that is parallel to said first branch and the winding and air gap therein, said first branch having a high resistance when said air gap is electrically non-conductive and a low resistance when said air gap is electrically conductive, said first winding being inductively coupled to said second winding and effective to reflect the impedance between said electrodes into said resonant portion, and control means having a first operative relationship and a second operative relationship, said control means when in said first operative relationship being effective to prevent the energy in said charge from being discharged from said storage means, said control means when in said second operative relationship being effective to interconnect said first and second discharge paths with said storage means for discharging the energy in said charge through said first and second paths, the portion of the energy in said second path being effective to produce a low voltage pulse between said electrodes and across said air gap, said voltage pulse occurring a predetermined time after said control means becomes disposed in said second operative relationship and being too low to strike an arc across said air gap but high enough to sustain an arc, the reflection of a low impedance into said first winding from said air gap being effective to prevent the portion of the energy in said first path and in said first winding from producing a high voltage pulse in said second winding and between said workpieces for the production of an initial arc between said workpieces to make said air gap conductive.

3. In a welder having a pair of electrode members separated by an air gap, means for discharging a single pulse of electrical energy into an electrical discharge arc that extends across said gap for heating said electrode members for welding them together, said means including:

energy storage means for storing substantially all of the energy that is to be dissipated in said arc, a transformer with a first winding and a second winding, an autotransformer having a single winding, a discharge circuit including a first portion connected to said first winding to form a high frequency discharge path through said first winding, said discharge circuit including a second portion connected to said second winding, said autotransformer, and to said electrode members to form a second discharge path that includes said gap and has a high resistance when said gap is not conductive, and normally open switch means operable to a closed position for momentarily connecting said circuit with said energy storage means for discharging the energy stored in said energy storage means through said circuit, said first transformer having a core consisting of a high frequency ferrite material having a low saturation and a low residual magnetism whereby said first discharge path will have a high resonant frequency and will be effective to produce a signal of corresponding frequency in said second discharge path and across said arc for striking said arc so that the energy in said second path can continue said arc at a low voltage, said autotransformer being adjustable to vary said low voltage through a range that is too low to strike said arc but is high enough to sustain said arc, said autotransformer being connected in said discharge circuit to provide a by-pass for the discharge of the energy storage means through the discharge circuit upon the closing of the switch means and before the striking of the arc and to provide for the discharge of the energy storage means through the discharge circuit including the autotransformer and the electrode members upon the striking of the arc.

4. In combination for providing an arc weld between first and second members, a source of energy, energy storage means having a variable capacitance operatively coupled to the source of energy to receive a charge of energy having a predetermined potential, said capacitance being variable through a range for storing a variable charge containing the amount of energy required to weld said members together, control means operatively coupled to the energy storage means and having a first operative relationship to prevent the transfer of energy in said charge from the capacitance and a second operative relationship to provide for transfer of the energy in said charge from the capacitance, second means operatively coupled to the first and second members and to the capacitance in the energy storage means during the second operative relationship of the control means to discharge an initial portion of the charge for the production of a pulse of high voltage at a first particular frequency between the first and second members upon the occurrence of a high impedance between these members to strike an arc at a low energy level between the first and second members, the second means being operatively coupled to the first and second members and to the capacitance in the energy storage means during the second operative relationship of the control means to provide a pulse of reduced voltage at a frequency below the particular frequency upon the occurrence of a low impedance between the first and second members for inhibiting the striking of the arc between the first and second members.

means operatively coupled to the capacitance in said energy storage means and to the first and second members and responsive to the striking of said arc for discharging the energy in said charge in an arc at a high energy level and low voltage for welding the members, and means operatively coupled to the energy storage means for varying said low voltage through a range too low to strike said arc and high enough to sustain said arc to thereby control the rate at which energy is fed into said arc.

5. A pulse arc welder for producing an electrical arc discharge across an air gap between a pair of workpieces, said welder comprising the combination of:
energy storage means for accumulating an electrical charge of energy containing the amount of energy required to be dissipated in said arc,
a first discharge path having a portion thereof with a high resonant frequency,
a second discharge path including said air gap and having at least a portion thereof coupled to said portion in the first discharge path for producing a high voltage pulse of said frequency across said air gap, and
control means having a first operative relationship effective to isolate both of said discharge paths from said energy storage means to prevent the discharge of said charge of energy from said storage means and having a second operative relationship for simultaneously connecting both of said discharge paths to said storage means for discharging an initial portion of said charge through said first path to create said high voltage pulse having said high frequency for striking an initial arc between said workpieces and for discharging the rest of said energy through said second path to form a continuation of said initial arc at a high energy level.

6. A pulse arc welder for discharging a pulse of energy between a pair of electrode members separated by an air gap, said welder comprising:
energy storage means having a capacity for storing all of the energy required to be dissipated in said arc,
a discharge circuit including a first discharge path and a second discharge path, each having an input end,
a first discharge path connected directly to said electrode members to include said air gap, said first path having a large resistance when said gap is electrically non-conductive and a low resistance when said arc is electrically conductive,
a second discharge path having the input end thereof connected to the input end of said first discharge path and a resonant portion that is coupled to said first path,
control means including a switch operable between a first position and a second position, said switch when in said first position being effective to isolate said input ends from said storage means and when in said second position being effective to simultaneously interconnect both of said input ends to said storage means for a brief moment,
said second discharge path being effective during said moment to discharge an initial portion of the energy in said storage means therethrough to produce a high frequency, high voltage in said first discharge path for striking an arc across said gap and causing said air gap to become electrically conductive,
said first path being effective during the interval said arc is conductive to discharge the remainder of the energy in said charge into said arc.

7. In combination for providing an arc weld between first and second members,
energy storage means for being operatively coupled to a source of energy to retain a charge of a particular amount of energy from the source,
control means having first and second operative relationships and operatively coupled to the energy storage means to provide for a transfer of energy from the energy storage means in the first operative relationship and to prevent a transfer of energy from the energy storage means in the second operative relationship,
inductively reactive means having properties of magnetic retentivity operatively coupled to the first and second members and to the energy storage means when the control means is in the first operative relationship to produce a voltage pulse of large amplitude between the first and second members for striking an arc between the members and discharging said charge into said arc, and
means operatively coupled to the inductively reactive means and responsive to the completion of said discharge for minimizing the magnetic retentivity of the inductively reactive means.

8. A pulse arc welder for welding a pair of workpieces together by means of an electrical arc discharge across an air gap therebetween, said welder comprising the combination of:
energy storage means for accumulating an electrical charge of energy containing the amount of energy require to heat said pieces to weld them together,
a first discharge path interconnected with said electrodes and including said air gap,
a second discharge path having a resonant portion with a normally high resonant frequency for producing a high voltage pulse of high frequency in response to the discharge of energy therethrough,
means connecting said paths to each other for transferring said pulse from said second path into said first path and for reflecting the impedance of said air gap to said portion, and
control means having a first operative relationship effective to prevent the discharge of the energy in said charge from said storage means and having a second operative relationship for discharging an initial portion of said charge through said second path to create between said workpieces a high voltage pulse having said high frequency for the production of an initial arc between said workpieces,
said first path being responsive to the striking of said arc for discharging the rest of said energy through said first path to form a continuation of said arc at an energy rate that is high enough to discharge the rest of the energy in said charge to melt portions of said workpieces within an interval of a few milliseconds that is too short to permit oxidation of the workpieces to occur.

9. An arc welder for producing a welding arc between two members having an air gap in between;
electrical energy storage means;
a first energy discharge path including a H.F. resonant circuit and including a transformer having primary and secondary windings;
a second energy discharge path including first and second parallel branches, said first branch including said members, said secondary winding and the gap in between said second branch including an impedance path of relatively high impedance relative to the impedance of an arc in between said members, but low relative to the open gap impedance;
the number of turns of said secondary winding being larger than the number of turns of said primary winding, said transformer constituting a component of said resonant circuit and the impedance in between said members consituting a damping resistance for said resonant circuit; and
means for concurrently coupling said first and second discharge paths to said energy storage means to first stimulate said resonant circuit and to subsequently discharge fully through an ignited arc between said members.

10. In combination for providing a weld arc between first and second members;
energy storage means operatively couplable to a source of energy to receive therefrom a particular amount of energy;
resonant circuit means resonating at a high frequency and being connected to said members;
selective control means for connecting said resonant circuit to said energy storage means for said resonant circuit to produce a pulse of voltage at the high frequency between the first and second members only upon the occurrence of an open circuit between the first and second members to obtain the production of an initial arc at a high voltage, low energy level between the first and second members;

means operatively coupled to the energy storage means by said control means and being further connected to the first and second members to create a low voltage pulse between the first and second members after striking of said initial arc for discharging the energy in the energy storage means in a pulse of controlled duration and at a high energy level to produce the weld arc between the first and second members; and bypass circuit means effective only when said initial arc fails to strike, to discharge said energy from said storage means so as to bypass first and second members.

11. In combination for providing a weld arc between first and second members;

energy storage means operatively couplable to a source of energy to receive therefrom a particular amount of energy;

a transformer having a secondary winding connected to one of said members to define a first discharge path, and a primary winding for defining a second discharge path and a saturable high frequency core for coupling said windings together;

control means having a first operative relationship in which said primary and secondary windings are both connected to said storage means and having a second operative relationship in which at least one of said windings is disconnected from said storage means, thereby preventing energy discharge of energy through said first and second windings;

first circuit means in said first discharge path connected to said primary winding and being responsive to the impedance between said members for producing a pulse of high voltage across said members in response to a discharge of energy therethrough only when there is an open circuit between the first and second members; and second circuit means in said second discharge path responsive to the production of the arc between the first and second members for discharging substantially all of the energy in the energy storage means in a pulse at a high energy level into said arc to produce the weld arc between the first and second members only when said high voltage pulse occurs.

12. The combination as set forth in claim 11, including means coupled to said storage means and said core and responsive to the completion of the discharge of energy from said storage means for applying a restoring coercive force to the core to remove residual magnetism.

13. In combination for providing a weld arc between first and second members;

energy storage means operative couplable to a source of energy to receive therefrom a particular amount of energy;

normally disabled circuit means operatively coupled to the first and second members and being responsive to the impedance between said members for producing, when enabled, a pulse of high voltage between said members only when there is a high impedance between the first and second members;

control means for selectively enabling and disabling said circuit means; and means for operatively coupling said energy storage means to said first and second members when said control means enables said circuit means and in response to the production of the arc between the first and second member for obtaining the discharge of the energy in the energy storage means in a pulse of controlled duration and at a high energy level in between said first and second members when said high voltage pulse struck an arc between said first and second members to produce the arc weld between the first and second members.

14. An arc welder for producing a welding arc between two members separated by a gap at least prior to welding;

electrical energy storage means;

a primary discharge path including said members and the gap between said members;

normally deenergized circuit means coupled to said members and having a high Q when the impedance across said gap is high and capable of producing a high voltage pulse across said gap only at high Q, high gap impedance conditions; and control means for concurrently connecting said primary discharge path and said circuit means to said storage means, so that a portion of the energy stored in said storage means stimulates said circuit means for producing a high voltage pulse to strike an arc across said gap, while the remainder of said energy flows through the primary discharge path.

15. A pulse arc welder for discharging a pulse of energy across an air gap defined by a pair of electrode members, comprising:

energy storage means for storing all of the energy required to be dissipated in said arc;

a discharge circuit coupled to said air gap and including a first discharge path and a second discharge path for the energy stored in said storage means, said first discharge path including said pair of electrode members and a variable step down transformer, further including coupling means serially connected to said electrode members for coupling said second discharge path to said first discharge path and to said electrode members, said second discharge path and said coupling means adapted for producing a high frequency, high voltage pulse across said gap for producing an initial arc; and control means having a first operative relationship for preventing the discharge of energy from said storage means through said discharge circuit, and having a second operative relationship for connecting said discharge circuit to said energy storage means, so that an initial portion of the energy in said storage means discharges through said second discharge path to strike an initial arc to thereby enable the discharge of the remaining portion of the energy through said first discharge path, said variable step down transformer being adjustable through a range wherein said voltage is too low to strike an arc across said air gap but is high enough to sustain said arc once it has been struck for discharging the remainder of the energy in said charge into said arc.

16. A pulse arc welder, comprising:

first and second members of electrically conductive material, there being, an air gap between the members, a source of energy, energy storage means operatively coupled to the source of energy to receive a particular amount of energy from the source, control means having first and second operative relationships and operatively coupled to the energy storage means to provide for a transfer of energy from the energy storage means in the first operative relationship and to prevent a transfer of energy from the energy storage means in the second operative relationship, first means responsive to the first operative relationship of the control means for producing a pulse of high voltage between the first and second members only upon the occurrence of an open circuit between the first and second members to obtain the production of an arc at a low energy level between the first and second members, and second means operatively coupled to the energy storage means and to the first and second members and responsive to the production of the arc between the first and second members for obtaining the discharge of the energy in the energy storage means in a pulse of controlled duration and at a high energy level to produce the arc weld between the first and second members.

References Cited by the Examiner

UNITED STATES PATENTS

| | | | |
|---|---|---|---|
| 1,721,348 | 7/1929 | Mawdsley | 219—135 X |
| 2,235,385 | 3/1941 | Rava | 219—113 X |
| 2,488,899 | 11/1949 | Cooper et al. | 219—100 X |
| 2,508,103 | 5/1950 | Dawson | 219—113 |
| 2,876,386 | 3/1959 | Fefer et al. | 219—69 X |
| 3,014,155 | 12/1961 | Inoue | 219—113 X |
| 3,052,817 | 9/1962 | Branker | 219—69 X |
| 3,136,880 | 6/1964 | Glorioso | 219—98 |

RICHARD M. WOOD, *Primary Examiner.*

MAX L. LEVY, *Examiner.*

R. F. STAUBLY, *Assistant Examiner.*